United States Patent
Liu

(10) Patent No.: US 8,249,581 B2
(45) Date of Patent: Aug. 21, 2012

(54) METHOD FOR TESTING WORKING STATES OF MOBILE PHONE

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 249 days.

(21) Appl. No.: 12/556,544

(22) Filed: Sep. 9, 2009

(65) Prior Publication Data
US 2010/0311413 A1    Dec. 9, 2010

(30) Foreign Application Priority Data
Jun. 4, 2009  (CN) .......................... 2009 1 0302921

(51) Int. Cl.
*H04W 24/00* (2009.01)
(52) U.S. Cl. ........ 455/423; 455/466; 455/404; 455/450; 455/509; 455/435; 455/558; 455/525; 455/412.2; 455/410; 370/328; 370/338; 370/352; 379/211.05; 379/357.01; 379/433.09
(58) Field of Classification Search .................. 370/328, 370/338, 252; 455/466, 404.1, 450, 509, 455/435.2, 558, 525, 412.2, 410, 411, 418, 455/419; 379/211.05, 357.01, 433.09
See application file for complete search history.

(56) References Cited

U.S. PATENT DOCUMENTS

| | | | |
|---|---|---|---|
| 6,397,054 B1 * | 5/2002 | Hoirup et al. | 455/404.1 |
| 6,799,057 B1 * | 9/2004 | Liverotti | 455/558 |
| 7,242,676 B2 * | 7/2007 | Rao et al. | 370/338 |
| 7,421,287 B2 * | 9/2008 | Cho et al. | 455/558 |
| 7,962,119 B2 * | 6/2011 | Kuz et al. | 455/404.1 |
| 2002/0002041 A1 * | 1/2002 | Lindgren et al. | 455/404 |
| 2003/0100321 A1 * | 5/2003 | Rao et al. | 455/466 |
| 2004/0076128 A1 * | 4/2004 | Rao et al. | 370/328 |
| 2004/0192252 A1 * | 9/2004 | Aerrabotu et al. | 455/404.1 |
| 2005/0181829 A1 * | 8/2005 | Cho et al. | 455/558 |
| 2007/0142049 A1 * | 6/2007 | Chae et al. | 455/435.2 |
| 2007/0232328 A1 * | 10/2007 | Kramarz-Von Kohout | 455/456.2 |
| 2008/0020798 A1 * | 1/2008 | Jang et al. | 455/558 |
| 2008/0043933 A1 * | 2/2008 | Pinault et al. | 379/45 |
| 2009/0305691 A1 * | 12/2009 | Suetsugu et al. | 455/422.1 |
| 2010/0142499 A1 * | 6/2010 | Zhang et al. | 370/338 |

* cited by examiner

*Primary Examiner* — Joseph Arevalo
(74) *Attorney, Agent, or Firm* — Altis Law Group, Inc.

(57) ABSTRACT

A method for testing working states of a mobile phone. The mobile phone is switched from a first working state to a second working state automatically by a switch module. In the first working state, a non-emergency phone number with a subscriber identity module card can be connected. The non-emergency phone number is dialed to test the working state of the mobile phone. The mobile phone is switched from the second working state to the first working state automatically by a switch module. The non-emergency phone number is dialed to test the working state of the mobile phone.

6 Claims, 2 Drawing Sheets

METHOD FOR TESTING WORKING STATES OF MOBILE PHONE

BACKGROUND

1. Technical Field

The disclosure generally relates to methods for testing mobile phones.

2. Description of Related Art

Mobile phones are becoming increasingly popular, and new models with enhanced functionality are constantly in demand. To ensure that a mobile phone is functioning as expected requires a series of tests before being sent to market. Typically, in a laboratory, a mobile phone is subjected to functional tests for validating the performance thereof. A functional test line of mobile phones has many workstations, each of which has one test for a component or a functional item. Conventionally, during the testing procedure, test results are manually recorded. So a plurality of operators is needed, and it may take a long time to finish the whole functional test line.

DETAILED DESCRIPTION

Figure 1:
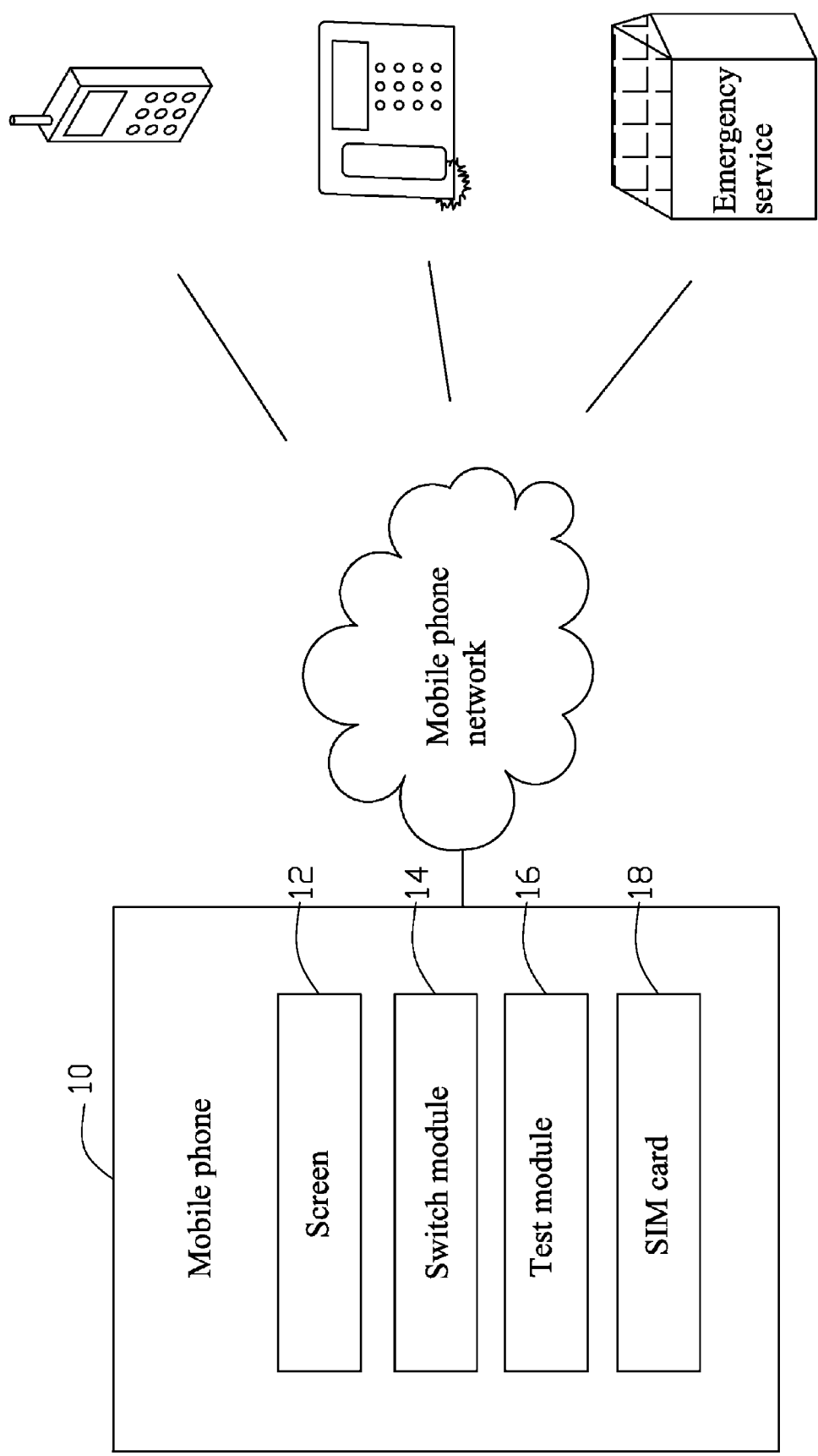
FIG. 1 is a block view showing components and a connection relationship of a mobile phone.

Referring to FIG. 1, a mobile phone 10 includes a screen 12, a switch module 14, a test module 16, and a subscriber identity module (SIM) card 18. The mobile phone 10 is connected to a mobile phone network, such as a global system for mobile communications (GSM) network. The switch module 14 is used for switching a working state of the mobile phone 10.

The mobile phone 10 can be detected if the mobile phone 10 is successfully switched from a first state to a second state. In the first state, the mobile phone 10 is ready for dialing non-emergency phone numbers with the SIM card 18. In the second state, a communicating function of the mobile phone 10 is disabled and only emergency telephone numbers may be dialed and connected using the mobile phone 10. Some mobile phones have a preprogrammed list of emergency numbers. On some networks, a GSM phone without a SIM card may be used to make emergency calls and most GSM phones accept a large list of emergency numbers without SIM card, such as 112, 911, 118, 119, 000, 110, 08, and 999.

Figure 2:
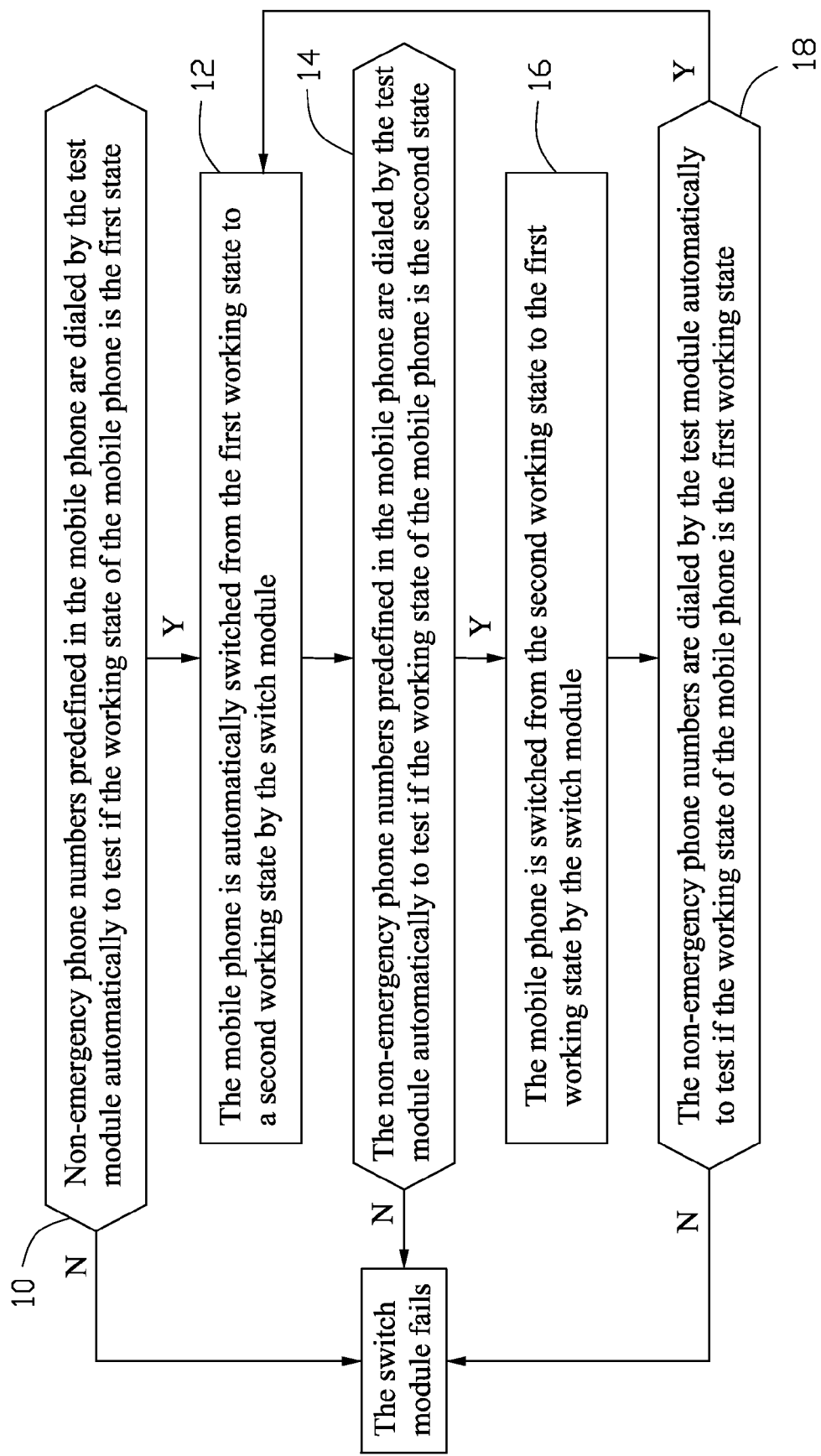
FIG. 2 is a flowchart of a method for testing a working state of the mobile phone.

Referring to FIG. 2, a method for testing working states of the mobile phone, includes the following steps:

In step 10, the SIM card 18 is inserted into the mobile phone 10, the mobile phone 10 is powered on, non-emergency phone numbers predefined in the mobile phone 10 are dialed by the test module 16 automatically to test if the working state of the mobile phone 10 is the first state. If the non-emergency phone numbers can be connected, the mobile phone 10 is in the first working state and step 12 is next.

In step 12, the mobile phone 10 is automatically switched from the first working state to a second working state by the switch module 14. This step further include: shielding communication signal from or disenabling the SIM card in the mobile phone 10.

In step 14, the non-emergency phone numbers predefined in the mobile phone 10 is dialed by the test module 16 automatically to test if the working state of the mobile phone 10 is the second state. If the non-emergency phone numbers cannot be connected, the mobile phone 10 has been successfully switched to the second state and step 16 is next. If the non-emergency phone numbers can be connected, the switch module has failed, and the mobile phone 10 is still in the first working state. The process ends.

In step 16, the mobile phone 10 is switched from the second working state to the first working state by the switch module 14. This step further include: enabling the SIM card in the mobile phone 10.

In step 18, the non-emergency phone numbers are dialed by the test module 16 automatically to test if the working state of the mobile phone 10 is the first working state. If the non-emergency phone numbers can be connected, the mobile phone 10 has been successfully switched to the first working state.

The steps 12-18 are repeated a predefined number of times. Test results are recorded and displayed on the screen 12 of the mobile phone 10 instantly.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for testing working states of a subscriber identity module card communicating through a mobile phone, the method comprising:

dialing non-emergency phone numbers to test a first working state of the mobile phone, wherein if non-emergency phone numbers can be connected, the mobile phone is in the first working state;

switching the mobile phone from the first working state to a second working state automatically by a switch module of the mobile phone, wherein the switching mobile phone from the first working state to the second working state comprises shielding communication signals of the subscriber identity module card in the mobile phone, wherein the subscriber identity module card is in the mobile phone during the switching from the first working state to the second working state;

dialing the non-emergency phone number to test the working state of the mobile phone, wherein if the non-emergency phone number cannot be connected, the mobile phone is in the second working state, wherein the non-emergency phone number is predefined in the mobile phone;

switching the mobile phone from the second working state to the first working state automatically by the switch module; and dialing the non-emergency phone number to test the working state of the mobile phone, wherein if the non-emergency phone number can be connected, the mobile phone has been successfully switched to the first working state;

wherein all the steps are repeated a predefined number of times.

2. The method of claim 1, wherein a testing result of the second working state of the mobile phone is recorded after the second working state of the mobile phone is tested.

3. The method of claim 2, wherein the testing result of the second working state of the mobile phone is displayed on a screen of the mobile phone.

4. The method of claim 1, wherein the mobile phone in the first working state communicates via a global system for mobile communications network.

5. The method of claim 1, wherein the mobile phone comprises a test module for dialing the non-emergency phone number when the mobile phone is switched from the first working state to the second working state or from the second working state to the first working state.

6. The method of claim 1, wherein the step of switching the mobile phone from the second working state to the first working state further comprises enabling a subscriber identity module card in the mobile phone.

* * * * *